United States Patent [19]
Lamont et al.

[11] Patent Number: 5,763,765
[45] Date of Patent: Jun. 9, 1998

[54] METHOD AND APPARATUS FOR DETECTING AND LOCATING PERFORATIONS IN MEMBRANES EMPLOYED IN ELECTROCHEMICAL CELLS

[75] Inventors: Gordon J. Lamont, New Westminster; David P. Wilkinson, North Vancouver, both of Canada

[73] Assignee: Ballard Power Systems Inc., Burnaby, Canada

[21] Appl. No.: 719,342

[22] Filed: Sep. 25, 1996

[51] Int. Cl.⁶ .................................................. G01M 3/04
[52] U.S. Cl. ........................................ 73/40.7; 73/38
[58] Field of Search ........................... 429/12; 73/40.7, 73/49.3, 38

[56] References Cited

U.S. PATENT DOCUMENTS

| | | |
|---|---|---|
| 3,811,317 | 5/1974 | Leonard et al. . |
| 3,937,064 | 2/1976 | Wolf, Jr. et al. . |
| 4,137,752 | 2/1979 | Mitchell et al. . |
| 4,674,321 | 6/1987 | Joshi . |
| 4,696,191 | 9/1987 | Claytor et al. ............... 73/600 |
| 5,004,913 | 4/1991 | Kleinerman ............ 250/227.21 |
| 5,128,269 | 7/1992 | Oitate et al. ............... 73/40.7 |
| 5,235,846 | 8/1993 | Fanciullo .................. 73/40.7 |
| 5,411,682 | 5/1995 | Nagashima . |

*Primary Examiner*—Hezron E. Williams
*Assistant Examiner*—Jay L. Politzer
*Attorney, Agent, or Firm*—McAndrews, Held & Malloy, Ltd.

[57] ABSTRACT

A method and apparatus detects and locates perforations in membranes used in electrochemical cells. The membrane has first and second oppositely facing major planar surfaces. The first surface is exposed to a first reactant fluid, preferably a gaseous mixture comprising hydrogen, while the second surface is exposed to a second reactant fluid, preferably ambient air comprising oxygen. The first and second reactant fluids are substantially fluidly isolated from each other by the membrane when no perforations are present in the membrane. The first reactant fluid contacts the second reactant fluid when at least one perforation is present in the membrane. The first and second reactant fluids exothermically react upon contact, preferably in the presence of a catalyst, to generate heat, which is then detected using an infrared thermal detector or thermal imaging device or a layer of thermally sensitive film positioned in proximity with the membrane.

20 Claims, 3 Drawing Sheets

METHOD AND APPARATUS FOR DETECTING AND LOCATING PERFORATIONS IN MEMBRANES EMPLOYED IN ELECTROCHEMICAL CELLS

FIELD OF THE INVENTION

The present invention relates to a quality control and diagnostic technique for membranes employed in electrochemical cells. The present invention also relates to a method and apparatus particularly suitable for detecting and locating perforations in the membranes of membrane electrode assemblies fabricated for incorporation into solid polymer electrochemical fuel cells.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes, each typically comprising a layer of porous, electrically conductive sheet material, such as carbon fiber paper or carbon cloth. The MEA contains a catalyst, typically platinum-based and disposed in a layer at each membrane/electrode interface, to induce the desired electrochemical reaction. In operation the electrodes are electrically coupled to provide a circuit for conducting electrons between the electrodes through an external circuit. Representative MEAs for solid polymer electrochemical fuel cells are described and illustrated in U.S. Pat. Nos. 5,176,966, 5,252,410 and 5,284,718.

At the anode, the fuel stream moves through the porous anode material and is oxidized at the anode electrocatalyst layer. At the cathode, the oxidant stream moves through the porous cathode material and is reduced at the cathode electrocatalyst layer. The ion exchange membrane conducts ions from one electrode to the other and substantially isolates the fuel stream from the oxidant stream.

In solid polymer fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

Anode reaction: 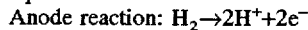
Cathode reaction: 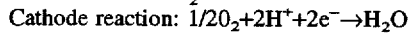

Suitable ion exchange membranes for solid polymer fuel cells include perfluorosulfonic ion exchange membranes, such as those sold by DuPont under its NAFION trade designation, Dow proprietary membrane (trade designation XUS 13204.10), and trifluorostyrene-based membranes such as those described in U.S. Pat. Nos. 5,422,411 and 5,498,639.

In the fabrication of membranes and MEAs for solid polymer fuel cells, the detection of perforations in the membrane is an important aspect of quality control because of the need during fuel cell operation to maintain fluid isolation of the fuel and oxidant streams. A perforation or leak in the membrane of a fuel cell can cause the fuel and oxidant streams to fluidly communicate and chemically react, thereby degrading the electrochemical potential of the fuel cell. Fluid communication of the fuel and oxidant streams through a perforation or leak in the membrane during fuel cell operation can also result in serious degradation of the membrane due to the combustion of the fuel in the presence of catalyst and oxygen. The ability to locate perforations in the membrane after its fabrication and/or after fabrication of the MEA can assist in diagnosis of the cause of the perforations. Further, the ability to detect and locate perforations in the membrane of an MEA after it has been used in an operating fuel cell can assist in analysis of degradation and failure mechanisms.

Previously used methods of leak detection, such as measurement of the leak rate of a fluid through the membrane with an applied pressure differential across the membrane, or the measurement of gas composition of a gas on one side of the membrane when a reference gas is applied to the other side, do not typically provide information on the location of perforations. Bubble detection methods require liquid contact with one face of the membrane or MEA, which may damage it, and do not precisely locate perforations.

The present method and apparatus are used to detect perforations in membranes by detecting heat generated by the exothermic reaction of a pair of reactants which are substantially isolated on opposite sides of the membrane, and which contact each other and react only if there is a perforation present. With the use of an appropriate heat detector, such as a thermal imaging device, the location of the perforations in the membranes may also be determined. The present method and apparatus is particularly suitable for the detection and location of perforations in a membrane which is consolidated in a solid polymer fuel cell MEA. In this case, the preferred pair of reactants is hydrogen and oxygen (in ambient air), the exothermic reaction of which is catalyzed by the fuel cell electrocatalyst which is adjacent the membrane in the consolidated MEA.

The present method and apparatus is also suitable for the detection and location of perforations in ion-exchange membranes and separators used in other types of electrochemical cells, such as for example electrolytic cells, and chloroalkali cells, batteries and in electrowinning, and also for membranes employed in plate-and-frame humidification sections of solid polymer electrochemical fuel cell stacks.

SUMMARY OF THE INVENTION

In a method for detecting perforations in a membrane for an electrochemical cell, the membrane having first and second oppositely facing major planar surfaces, the method comprises:

exposing the first surface to a first reactant fluid while exposing the second surface to a second reactant fluid, the first and second reactant fluids substantially fluidly isolated from each other by the membrane when no perforations are present in the membrane, the first reactant fluid contacting the second reactant fluid when at least one perforation is present in the membrane, the first and second reactant fluids exothermically reacting upon contact to generate heat;

detecting the exothermically generated heat.

In a preferred method, a pressure differential is imparted across the membrane whereby, when at least one perforation is present in the membrane, the first reactant fluid is forced through the at least one perforation to contact the second reactant fluid. The second major planar surface is preferably disposed adjacent a layer comprising catalyst which promotes the exothermic reaction of the first and second reactant fluids. The membrane and the layer comprising catalyst are preferably components of a consolidated membrane electrode assembly.

The first and second reactant fluids are selected to be fluids to which the membrane is substantially impermeable, so that in the absence of a perforation, they are substantially isolated from each other by the membrane. The first and second reactant fluids are preferably gases, the first reactant fluid preferably comprising hydrogen and the second reactant fluid preferably comprising oxygen. The second reactant fluid is preferably ambient air. The first reactant fluid preferably further comprises an inert gas, most preferably nitrogen. Alternative pairs of reactant fluids which may be used include, but are not limited to, methanol-oxygen and carbon monoxide-oxygen.

In a preferred method, the exothermically generated heat is detected using an infrared thermal detector. In a method for detecting and locating perforations in a membrane for an electrochemical cell the exothermically generated heat is detected by a thermal imaging device, preferably an infrared thermal imaging device. Alternatively, the exothermically generated heat is detected and located using a layer of thermally sensitive film, including for example thermally sensitive paper, positioned in proximity with the membrane.

In an apparatus for detecting perforations in a membrane for an electrochemical cell, the membrane having first and second oppositely facing major planar surfaces, the apparatus comprises:

a fixture having an opening formed therein, the first surface of the membrane sealable across the opening to form an enclosed chamber, the second surface of the membrane exposed to ambient air;

a source for introducing a first reactant fluid to the enclosed chamber, the first reactant fluid selected such that the first reactant fluids reacts exothermically with oxygen, the first reactant fluid substantially isolated from the ambient air by the membrane when no perforations are present in the membrane, the first reactant fluid contacting the ambient air when at least one perforation is present in the membrane, the first reactant fluid and the oxygen present in ambient air exothermically reacting upon contact to generate heat;

a heat detector for detecting the exothermically generated heat.

In the preferred apparatus, the source introduces a pressurized first reactant fluid to the enclosed chamber whereby, when at least one perforation is present in the membrane, the first reactant fluid is forced through the at least one perforation to contact the ambient air. The second major planar surface is preferably disposed adjacent a layer comprising catalyst which promotes the exothermic reaction of the first reactant fluid with oxygen. The membrane and the layer comprising catalyst are preferably components of a consolidated membrane electrode assembly.

The first reactant fluid is preferably a gas, preferably comprising hydrogen. The first reactant fluid preferably further comprises an inert gas, most preferably nitrogen.

In a preferred apparatus, the heat detector comprises an infrared thermal detector. In a preferred apparatus for detecting and locating perforations in a membrane for an electrochemical cell the heat detector comprises an infrared thermal imaging device. Alternatively, the heat detector comprises a layer of thermally sensitive film positioned in proximity with the membrane.

In another apparatus for detecting perforations in a membrane for an electrochemical cell, the membrane having first and second oppositely facing major planar surfaces, the apparatus comprises:

a first fixture having a first opening formed therein, the first surface of the membrane sealable across the first opening to form a first enclosed chamber;

a second fixture having a second opening formed therein, the second surface of the membrane sealable across the second opening to form a second enclosed chamber;

a first source for introducing a first reactant fluid to the first enclosed chamber;

a second source for introducing a second reactant fluid to the second enclosed chamber;

the first reactant fluid selected such that the first reactant fluid reacts exothermically with the second reactant fluid, the first reactant fluid substantially isolated from the second reactant fluid by the membrane when no perforations are present in the membrane, the first reactant fluid contacting the second reactant fluid when at least one perforation is present in the membrane, the first reactant fluid and the second reactant fluid exothermically reacting upon contact to generate heat;

a heat detector for detecting the exothermically generated heat.

In the preferred apparatus, the first source introduces a pressurized first reactant fluid to the enclosed chamber whereby, when at least one perforation is present in the membrane, the first reactant fluid is forced through the at least one perforation to contact the second reactant fluid. The second major planar surface is preferably disposed adjacent a layer comprising catalyst, the first reactant fluid and the second reactant fluid exothermically reacting upon contact in the presence of the catalyst to generate heat. The membrane and the layer comprising catalyst are preferably components of a consolidated membrane electrode assembly.

The first and second reactant fluids are preferably gases, the first reactant fluid preferably comprising hydrogen and the second reactant fluid comprising oxygen. The first reactant fluid preferably further comprises an inert gas, most preferably nitrogen.

In a preferred apparatus, the heat detector comprises an infrared thermal detector. In a preferred apparatus for detecting and locating perforations in a membrane for an electrochemical cell the heat detector comprises an infrared thermal imaging device. Alternatively, the heat detector comprises a layer of thermally sensitive film positioned in proximity with the membrane.

DETAILED DESCRIPTION OF THE PREFERRED EMBODIMENTS

The term "perforations" as used herein includes pinholes, ruptures and tears, or localized regions of reduced thickness and/or higher permeability relative to the bulk membrane, and other such defects in the membrane which would cause fluid, typically gas, to leak through the thickness of the membrane.

Figure 1:
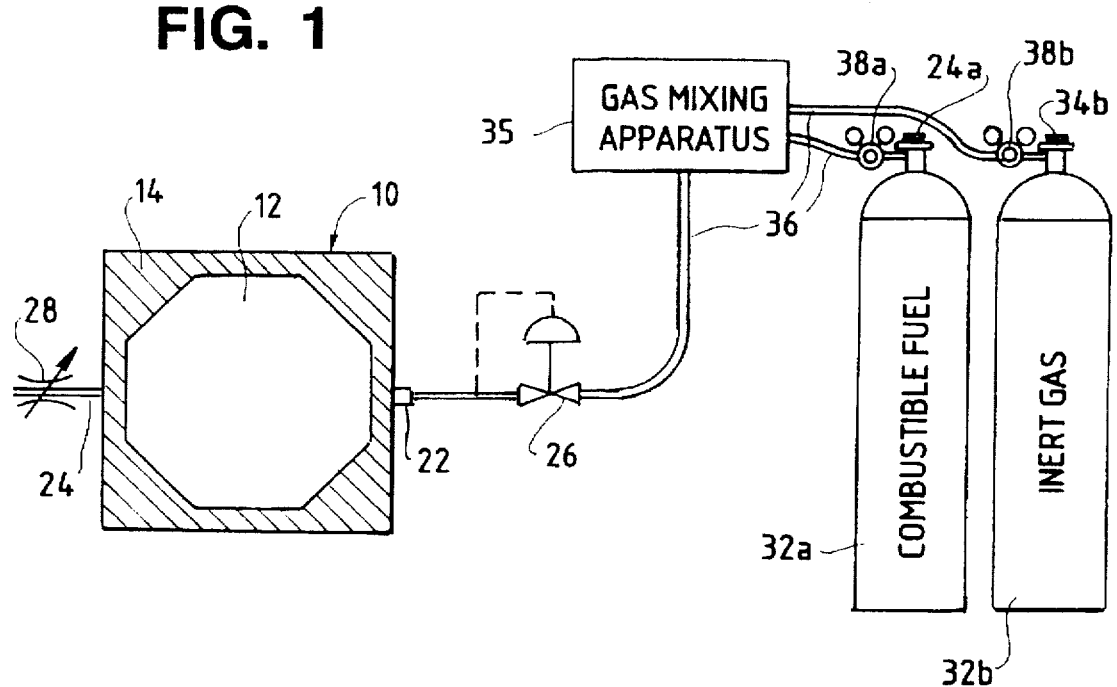
FIG. 1 is a top plan schematic view of an apparatus for detecting and locating leaks in the membranes of membrane electrode assemblies for electrochemical fuel cells.

Turning first to FIG. 1, a membrane electrode assembly 10 includes an electrochemically active portion 12 and an inactive portion 14. Portion 12 is rendered active by the presence of an electrocatalyst, typically in the form of finely comminuted platinum in a layer at each of the membrane/electrode interfaces located on opposite faces of the electrolyte membrane. The apparatus for detecting and locating leaks in the membrane of MEA 10 includes a pressurizable gas-containing fixture (most of which is hidden below MEA 10 in FIG. 1) with a pressurized gas stream inlet 22 and a pressurized gas stream outlet 24. Inlet 22 has a pressure regulator 26 associated therewith and outlet 24 has a metering valve 28 associated therewith, for controlling and monitoring the gas pressure within the fixture located between inlet 22 and outlet 24. A pressurized reactant gas source, shown in FIG. 1 as a fuel tank 32a and a diluent inert gas source, shown in FIG. 1 as a gas tank 32b, each tank having a valve 34a, 34b, respectively, and a pressure regulator 38a, 38b, respectively, are fluidly connected to inlet 22 by hoses 36, via a gas mixing apparatus 35 for controlling the concentration of the reactant gas. The pressurized fuel source in tank 32a is preferably hydrogen and the pressurized diluent gas in tank 32b is preferably nitrogen.

Figure 2:
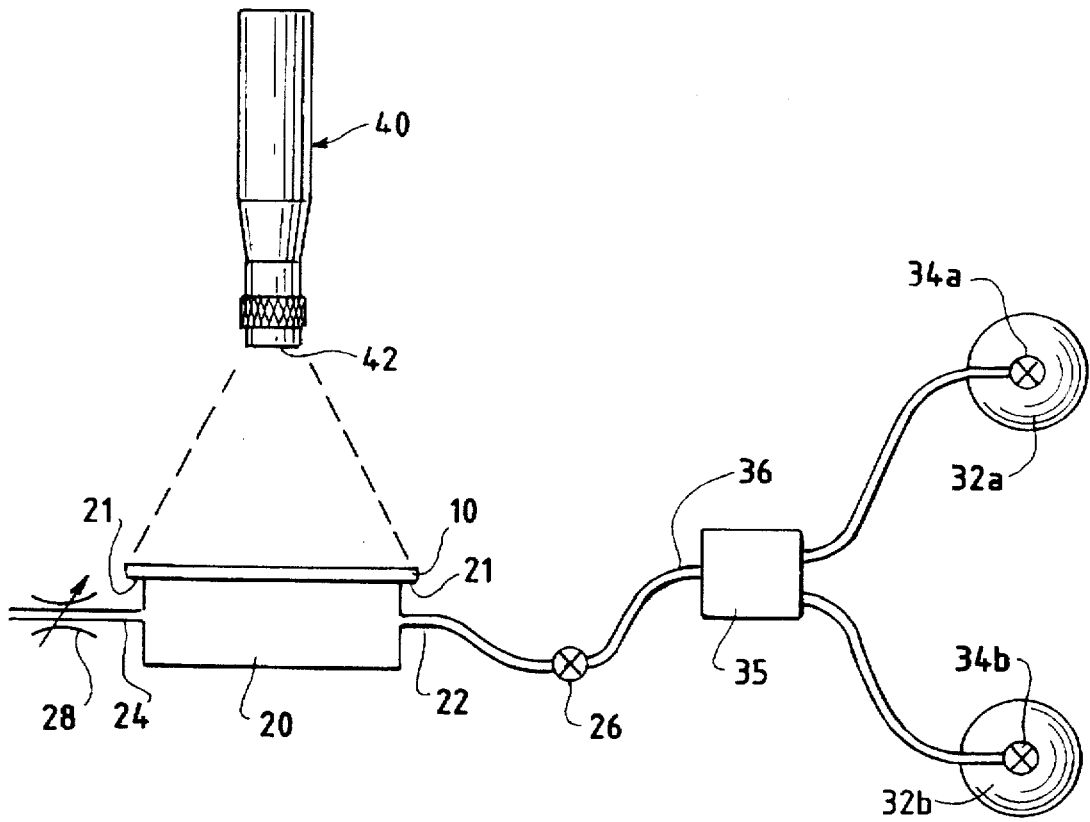
FIG. 2 is a side elevation schematic view of the membrane leak detection and locating apparatus illustrated in FIG. 1.

FIG. 2 shows the membrane leak detection and locating apparatus with the pressurized gas-containing fixture 20 and MEA 10 mounted thereon. Seals 21 provide a fluid-tight seal between MEA 10 and the adjacent walls of fixture 20 so that pressurized fuel gas is retained within the volume or chamber formed by the cooperating interior surfaces of fixture 20 and MEA 10. FIG. 2 also shows inlet 22 and outlet 24 having a pressure regulator 26 and metering valve 28 associated therewith respectively. FIG. 2 also shows reactant gas tank 32a and diluent gas tank 32b with valves 34a, 34b respectively, and hose 36 fluidly connecting the tanks to inlet 22 via gas mixing apparatus 35. The construction of the fixture and the sealing mechanism employed to seal the MEA against the fixture to form an enclosed chamber is a matter of design choice.

FIG. 2 also shows the relative position of infrared camera 40 having a lens 42 focused on the exterior surface of MEA 10, as depicted schematically by the broken lines in FIG. 2.

Figure 3:
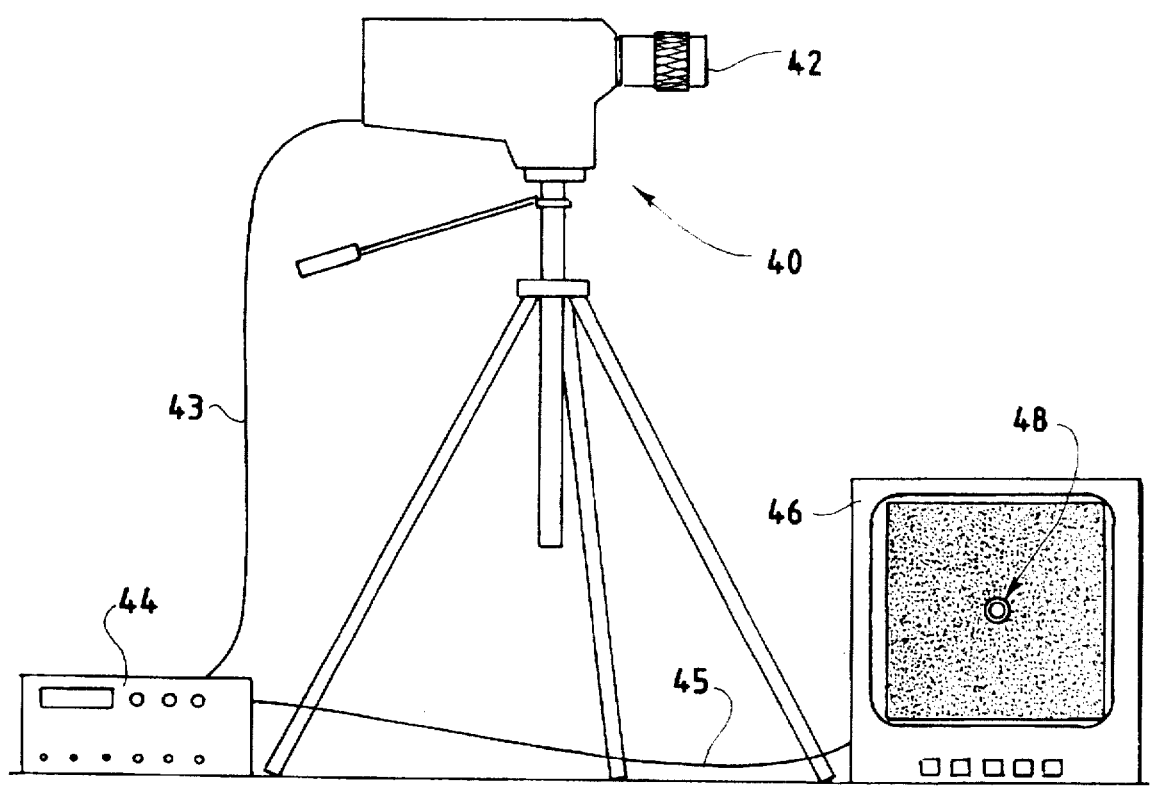
FIG. 3 is a schematic diagram of an infrared thermal imaging device, including an infrared heat detection camera, electronic signal analyzer and monitor for displaying the presence and location of perforations in the membranes of membrane electrode assemblies for electrochemical fuel cells.

FIG. 3 schematically illustrates the tripod mounted infrared detection camera 40, with lens 42, electrically connected by a cable 43 to electronic signal analyzer 44, which is in turn electrically connected by a cable 45 to a monitor 46 for digitizing and displaying the presence and location of perforations in the membrane of an MEA mounted on the fixture illustrated in FIGS. 1 and 2 and described above. In the schematic depiction of FIG. 3, the presence of a perforation in the membrane is indicated by a light area 48 on the contrasting dark background.

In operation, a pressurized hydrogen-rich gas is applied within fixture 20 to the interior side of a bonded MEA 10 (see FIG. 2). The signal generated by infrared camera 40 focused on the exterior facing electrode of MEA 10, which is exposed to ambient oxygen-containing air, when processed by electronic analyzer 44 and displayed on monitor 46 (see FIG. 3) will indicate whether and where hot spots occur from the exothermic reaction of air with hydrogen passing through a perforation in the membrane, the reaction being catalyzed by catalyst in the electrocatalyst layer on the upper face of the membrane.

Figure 4:
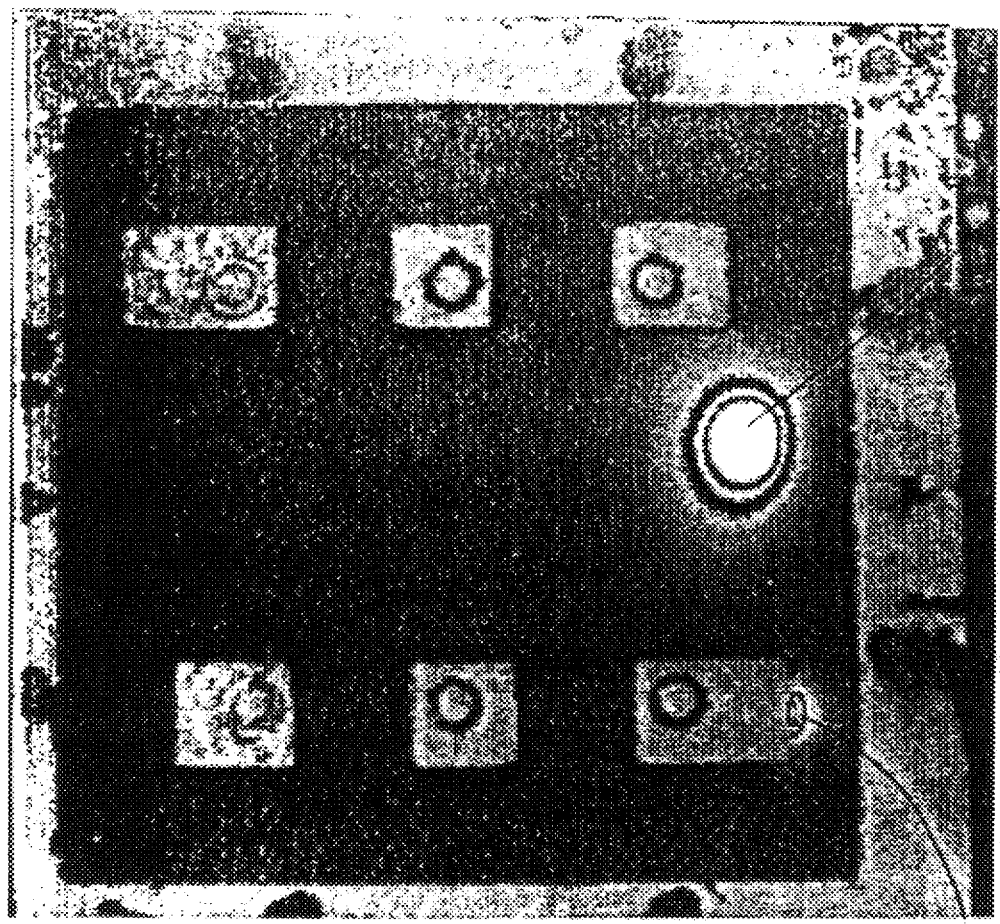
FIG. 4 is a photographic depiction of a monitor display, showing the presence and location of perforations in a test membrane in a consolidated MEA, obtained using the detection apparatus of FIGS. 1–3.

FIG. 4 is a photographic depiction of the monitor display illustrating the presence and location of perforations, A and B, in a membrane of a test MEA known to have leaks, using the detection apparatus of FIGS. 1–3. The test which generated the display depicted in FIG. 4 was performed using substantially pure hydrogen gas as the reactant fluid, thus resulting in relatively large hot spots on the exposed electrode surface, as shown by the white areas, A and B, in FIG. 4.

Diluting the pure hydrogen gas with an inert gas such as nitrogen would be expected to improve the accuracy in locating leaks in the membranes and in determining the shape and nature of perforations. Other combustible fuels besides hydrogen would also be suitable for use in the present method and apparatus for detecting and locating perforations in membranes.

The magnitude of the pressure differential applied across the membrane in the present method for detecting perforations can be controlled and selected so that the integrity of the membrane can be tested at specific pressure differentials. For example, it may be advantageous to test the membrane for leaks at a pressure differential which is greater than that it which is likely to experience in operation, for example in a fuel cell stack. Further, applying a higher pressure differential across the membrane will force more gas through any perforations which are present and will increase the sensitivity of the method for detecting smaller perforations.

A variety of heat detectors and thermal imaging devices are suitable for use in the present method and apparatus, including infrared cameras with a single infrared sensor in which a system of mirrors is used to scan the image on to the sensor, and infrared cameras with a focal plane array which eliminates some moving parts by incorporating many individual sensors on to a single sensor. Examples of suitable commercially available infrared imaging equipment include the TVS-100 Series Thermal Video System from Cincinnati Electronics Corp., Mason, Ohio, Thermovision 550® from Agema Infrared Systems, Burlington, Ontario and Prism DS from FLIR Systems, Inc., Portland, Oreg.

The preferred infrared thermal imaging devices used in the present method and apparatus are capable of differentiating 0.2° C. variations in temperature across the surface of an MEA, thereby allowing the precise location of the leak to within approximately 5 mm.

Other heat detection techniques besides infrared heat detection could be employed as well such as, for example, heat sensitive film or paper. However, such other techniques have been found not to provide the precision of infrared heat detection.

The detection and location of perforations in unbonded membranes (not in MEAS) can also be accomplished by the present method and apparatus. In one embodiment, the unbonded membrane is placed between the reactant gas-containing fixture and a catalyzed sheet of porous media, such as carbon fiber paper having a layer of appropriate catalyst applied on a major surface thereof. Leaks in the unbonded membrane can then be detected and located as described above for bonded MEAs.

The present method and apparatus for detecting and optionally locating perforations in a membrane may be used for membranes and MEAs which have manifold or other openings (for example to accommodate fasteners) formed therein. The fixture can be designed to seal around such openings so that the remainder of the membrane can be tested. Further the present method and apparatus may be employed as part of an automated membrane and/or MEA manufacturing process, including reel-to-reel type processes, and could be used in conjunction with an intelligent system which would process thermal image data and perform automatic quality control.

While particular elements, embodiments, and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of detecting and locating perforations in a membrane for an electrochemical cell, said membrane having first and second oppositely facing major planar surfaces, the method comprising:

exposing said first surface to a first reactant fluid while exposing said second surface to a second reactant fluid, said first and second reactant fluids substantially fluidly isolated from each other by said membrane when no perforations are present in said membrane, said first reactant fluid contacting said second reactant fluid when at least one perforation is present in said membrane, said first and second reactant fluids exothermically reacting upon contact to generate heat;

detecting said exothermically generated heat and determining the location at which said heat is generated.

2. The method of claim 1 further comprising imparting a pressure differential across said membrane whereby, when at least one perforation is present in said membrane, said first reactant fluid is forced through said at least one perforation to contact said second reactant fluid.

3. The method of claim 1 wherein said second major planar surface is disposed adjacent a layer comprising catalyst which promotes said exothermic reaction.

4. The method of claim 3 wherein said membrane and said layer comprising catalyst are components of a consolidated membrane electrode assembly.

5. The method of claim 4 wherein said first and second reactant fluids are gases.

6. The method of claim 5 wherein said first reactant fluid comprises hydrogen and said second reactant fluid comprises oxygen.

7. The method of claim 6 wherein said second reactant fluid is ambient air.

8. The method of claim 1 wherein said exothermically generated heat is detected using an infrared thermal detector.

9. The method of claim 1 wherein said exothermically generated heat is detected using an infrared thermal imaging device.

10. The method of claim 1 wherein said exothermically generated heat is detected using a layer of thermally sensitive film positioned in proximity with said membrane.

11. An apparatus for detecting and locating perforations in a membrane for an electrochemical cell, said membrane having first and second oppositely facing major planar surfaces, said apparatus comprising:

a fixture having an opening formed therein, said first surface of said membrane sealable across said opening to form an enclosed chamber, said second surface of said membrane exposed to ambient air;

a source for introducing a first reactant fluid to said enclosed chamber, said first reactant fluid selected such that said first reactant fluid reacts exothermically with oxygen present in ambient air, said first reactant fluid substantially isolated from said ambient air by said membrane when no perforations are present in said membrane, said first reactant fluid contacting ambient air when at least one perforation is present in said membrane, said first reactant fluid and said oxygen present in ambient air exothermically reacting upon contact to generate heat;

a heat detector for detecting said exothermically generated heat and determining the location at which said heat is generated.

12. The apparatus of claim 11 wherein said source introduces a pressurized first reactant fluid to said enclosed chamber whereby, when at least one perforation is present in said membrane, said first reactant fluid is forced through said at least one perforation to contact said ambient air.

13. The apparatus of claim 11 wherein said second major planar surface is disposed adjacent a layer comprising catalyst which promotes said exothermic reaction.

14. The apparatus of claim 13 wherein said membrane and said layer comprising catalyst are components of a consolidated membrane electrode assembly.

15. The apparatus of claim 14 wherein said first, reactant fluid is a gas.

16. The apparatus of claim 15 wherein said first reactant fluid comprises hydrogen.

17. The apparatus of claim 11 wherein said heat detector comprises an infrared thermal detector.

18. The apparatus of claim 11 wherein said heat detector comprises an infrared thermal imaging device.

19. The apparatus of claim 11 wherein said heat detector comprises a layer of thermally sensitive film positioned in proximity with said membrane.

20. An apparatus for detecting and locating perforations in a membrane for an electrochemical cell, said membrane having first and second oppositely facing major planar surfaces, said apparatus comprising:

a first fixture having a first opening formed therein, said first surface of said membrane sealable across said first opening to form a first enclosed chamber;

a second fixture having a second opening formed therein, said second surface of said membrane sealable across said second opening to form a second enclosed chamber;

a first source for introducing a first reactant fluid to said first enclosed chamber;

a second source for introducing a second reactant fluid to said second enclosed chamber;

said first reactant fluid selected such that said first reactant fluid reacts exothermically with said second reactant fluid, said first reactant fluid substantially isolated from said second reactant fluid by said membrane when no perforations are present in said membrane, said first reactant fluid contacting said second reactant fluid when at least one perforation is present in said membrane, said first reactant fluid and said second reactant fluid exothermically reacting upon contact to generate heat;

a heat detector for detecting said exothermically generated heat and determining the location at which said heat is generated.

* * * * *